United States Patent
Kashani

(10) Patent No.: US 10,244,607 B1
(45) Date of Patent: Mar. 26, 2019

(54) DAYLIGHT HARVESTING LIGHT FIXTURE AND CONTROL SYSTEM FOR SAME

(71) Applicant: DMF Inc., Carson, CA (US)

(72) Inventor: Oren Kashani, Petach Tikva (IL)

(73) Assignee: DMF Inc., Carson, CA (US)

( * ) Notice: Subject to any disclaimer, the term of this patent is extended or adjusted under 35 U.S.C. 154(b) by 0 days.

(21) Appl. No.: 15/853,400

(22) Filed: Dec. 22, 2017

Related U.S. Application Data

(63) Continuation of application No. 15/158,538, filed on May 18, 2016, now Pat. No. 9,854,642.

(60) Provisional application No. 62/163,328, filed on May 18, 2015.

(51) Int. Cl.
  *H05B 37/02* (2006.01)
  *H05B 33/08* (2006.01)

(52) U.S. Cl.
  CPC ..... *H05B 37/0218* (2013.01); *H05B 33/0854* (2013.01)

(58) Field of Classification Search
  CPC .... H05B 37/02; H05B 37/0218; H05B 33/02; H05B 33/08; H05B 33/0803; H05B 33/0806; H05B 33/0854
  See application file for complete search history.

(56) References Cited

U.S. PATENT DOCUMENTS

| | | | |
|---|---|---|---|
| 6,583,573 B2 | 6/2003 | Bierman | |
| 7,190,126 B1 | 3/2007 | Paton | |
| 7,592,583 B2 | 9/2009 | Page et al. | |
| 9,078,299 B2 | 7/2015 | Ashdown | |
| 2004/0071471 A1* | 4/2004 | Baker | H04B 10/1143 398/140 |
| 2007/0185675 A1 | 8/2007 | Papamichael et al. | |
| 2010/0244709 A1* | 9/2010 | Steiner | G01J 1/02 315/158 |
| 2012/0074852 A1 | 3/2012 | Delnoij | |
| 2012/0249017 A1* | 10/2012 | Grady | H05B 37/0218 315/360 |
| 2013/0009552 A1 | 1/2013 | Page | |
| 2014/0354150 A1* | 12/2014 | Joseph | H05B 33/0872 315/51 |

* cited by examiner

*Primary Examiner* — Jason Crawford

(74) *Attorney, Agent, or Firm* — Foley & Lardner LLP

(57) ABSTRACT

A daylight harvesting light fixture has a housing defining a light aperture, a light emitting diode (LED) in the housing for providing illumination through the aperture, a power supply for supplying drive current to the LED; a photosensor for sensing ambient illumination through the housing aperture, and a control circuit programmed and connected for a) turning off current to the LED for a dark interval imperceptible to the human eye; b) deriving an ambient illumination level signal based on the photosensor output while the LED is turned off; c) calculating an LED light output complementary to measured ambient illumination to achieve a target ambient illumination; and d) restoring drive current to the LED at a level adjusted to produce the calculated complementary LED light output. This sequence may be repeated periodically to maintain a target ambient illumination.

17 Claims, 4 Drawing Sheets

DAYLIGHT HARVESTING LIGHT FIXTURE AND CONTROL SYSTEM FOR SAME

CROSS-REFERENCE TO RELATED APPLICATIONS

The present application is a continuation of U.S. patent application Ser. No. 15/158,538, filed May 18, 2016, now U.S. Pat. No. 9,854,642, which application claims priority to U.S. Provisional Patent Application No. 62/163,328, filed May 18, 2015, the contents of all such applications being incorporated herein by reference in their entirety.

TECHNICAL FIELD

The present embodiments relate to lighting control systems and more particularly to improvements in daylight harvesting light fixtures and electronic control systems for the same.

BACKGROUND

Energy for interior illumination can be conserved by limiting artificial light to no more than needed for supplementing available daylight to achieve a desired or target level of interior lighting. Since available daylight illumination varies continuously over the course of the day it becomes necessary to adjust the artificial light complement accordingly in order to maintain a constant combined level of illumination. This technique of supplementing available daylight with electric light has come to be known as daylight harvesting. Substantial energy savings can be realized by this method.

Current daylight harvesting technology is limited to use of daylight photosensors external to the electric light fixtures in an effort to minimize introduction of artificial light into the measurement of available ambient daylight. The location of the daylight sensors depends in part upon the type of control being used, whether open loop or closed loop or some combination of these. Open loop systems attempt to isolate the photosensor from the electrical illumination by mounting the sensor outside the interior space being illuminated, such as on a roof or exterior wall of the building, or sometimes on an interior wall but aiming the sensor at an exterior window or skylight. In closed loop systems the photosensor is situated for measuring overall interior illumination and the sensor output is used to adjust the artificial light level to achieve the desired target level of overall interior illumination. Such a closed loop sensor might be installed on a ceiling facing down towards work surfaces such as desktops to measure the total illumination on the work surfaces.

Both types of systems require careful calibration of the photosensor output and the respective control modules to correctly isolate the effect of changes in available daylight upon illumination of the important parts of the interior space. It is also important to compensate for spillover direct illumination of the sensor by the electric interior lights which may distort the measurement of target interior illumination by the sensor.

Wall and ceiling mounted photosensor modules external to the electric light fixtures complicate installation and maintenance of daylight harvesting illumination. A need exists for daylight harvesting lamp fixtures having daylight sensors integral to the light fixture. Such installation presents difficulties which to date have remained unsolved. Mounting the photosensor inside the fixture exposes it to direct illumination by the lamp, saturating the sensor. Conversely, installing the photosensor to one side of the aperture of the light fixture and away from direct exposure to the lamp places the sensor behind ornamental trim which typically surrounds the aperture of the light fixture, and would require an opening in the trim in alignment with the photosensor. This is a significant disadvantage as many interchangeable ornamental trim pieces exist in standard sizes which could not be used without the special opening for the sensor. Even if an opening is provided, the orientation of the trim piece then becomes restricted by the location of the sensor, so that square trim pieces, for example, could not be aligned with walls unless care was taken to install the entire fixture in correct orientation.

DETAILED DESCRIPTION

Figure 1:
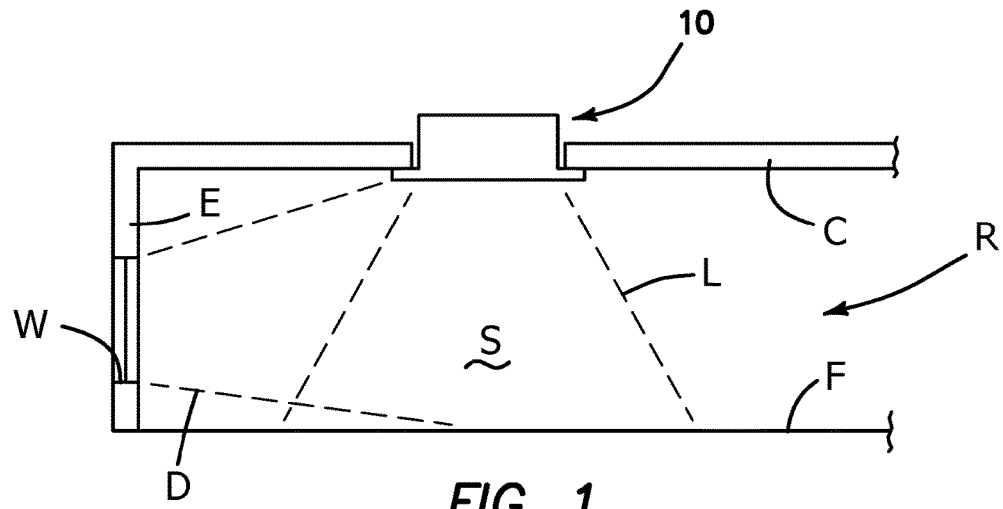
FIG. 1 is an elevational view of a room illuminated by one ceiling mounted light module and natural daylight admitted through a window.

With reference to the accompanying drawings, in which like elements are designated by like numerals, FIG. 1 is a schematic representation of an enclosed interior space or room R, with an end wall E in which a window W admits natural daylight D. A daylight harvesting lamp module 10 according to this invention is installed in ceiling C above a floor F for illuminating a space S (the illuminated space) generally underlying the lamp module 10 in room R. At different times of day space S in room R is illuminated by either or both of natural daylight D admitted through window W and artificial light L produced by lamp module 10. Illumination of space S includes artificial illumination provided by lamp module 10 in combination with ambient illumination. Ambient illumination is defined here as existing illumination in space S without any contribution from module 10. In a simple situation where a single module 10 is the sole source of artificial light in space S, ambient illumination may consist entirely of natural daylight D streaming through openings such as windows or skylights. In more complicated environments, ambient illumination may include artificial illumination contributed by light fixtures other than module 10, alone or in combination with natural daylight D entering the space S.

Figure 2:
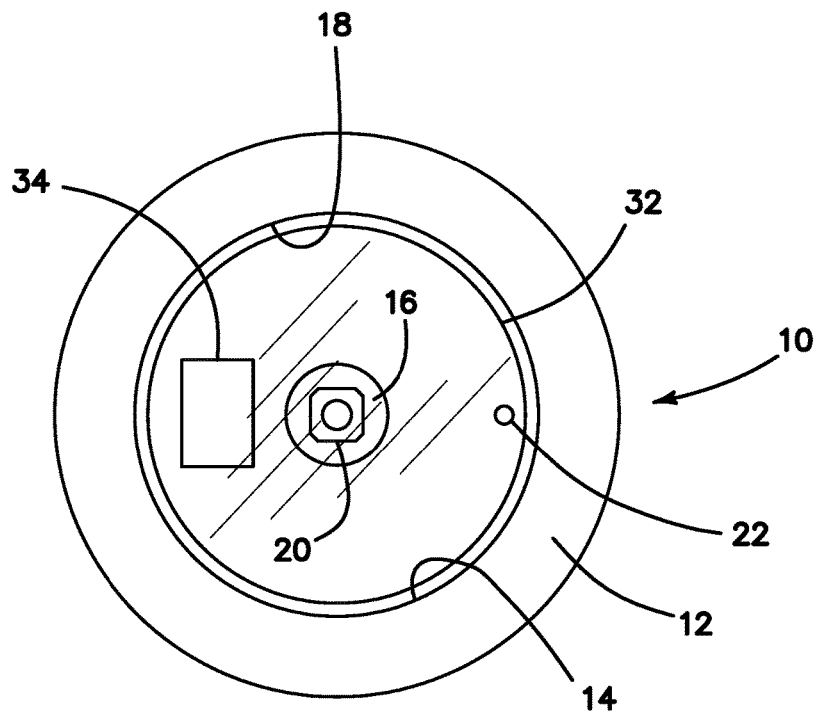
FIG. 2 is a bottom plan view of a typical daylight harvesting LED lamp module according to this invention.
Figure 3:
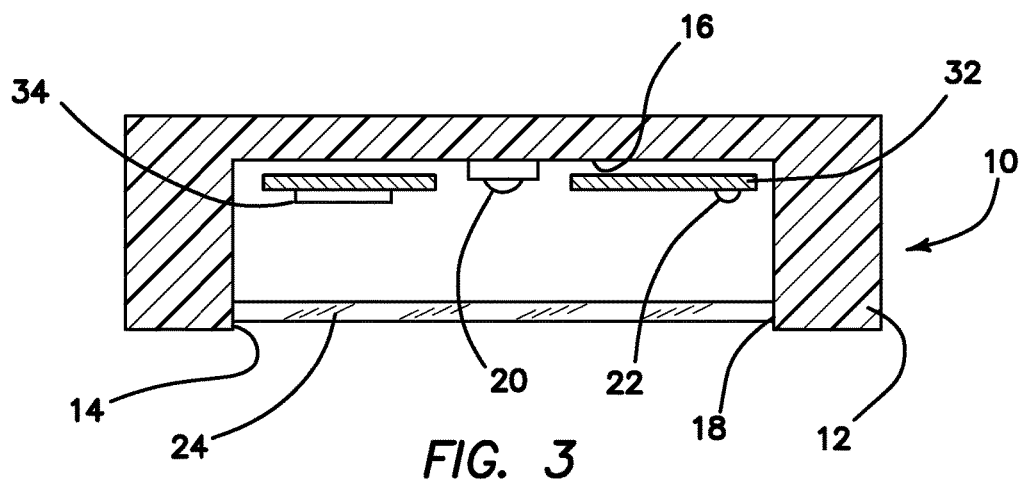
FIG. 3 is an elevational cross section of the light module of FIG. 2.

The daylight harvesting lamp module 10 is shown in greater detail in FIGS. 2 and 3. Lamp module 10 has a module housing 12 which may be of die cast aluminum for heat sinking purposes, with a module cavity 14 which has a closed end 16 and a light aperture 18. An electrically powered light source such as a relatively high intensity LED (light emitting diode) 20 is mounted in thermal contact with housing 12 at the closed end 16 in housing cavity 14 for directing illumination through light aperture 18. A transparent or translucent lens 24 closes aperture 18 as shown in FIG. 3 to keep the interior of cavity 14 free of dust, and optionally may also serve an optical function such as more evenly diffusing or condensing the light output of LED 20.

A photosensor such as phototransistor 22 installed in module cavity 14 is oriented or sensing through aperture 18 the level of ambient illumination in the illuminated space S. An annular circuit board 32 carries photosensor 22 with its lens facing light aperture 18, and other electronic components which make up the module control circuit, collectively indicated as element 34 in FIGS. 2 and 3. Photosensor 22 is chosen to be responsive to light wavelengths visible to the human eye, including natural daylight. Photosensor 22 is further selected to have relatively fast response, e.g. about 200 microseconds or less, to changes in light input.

Figure 4:
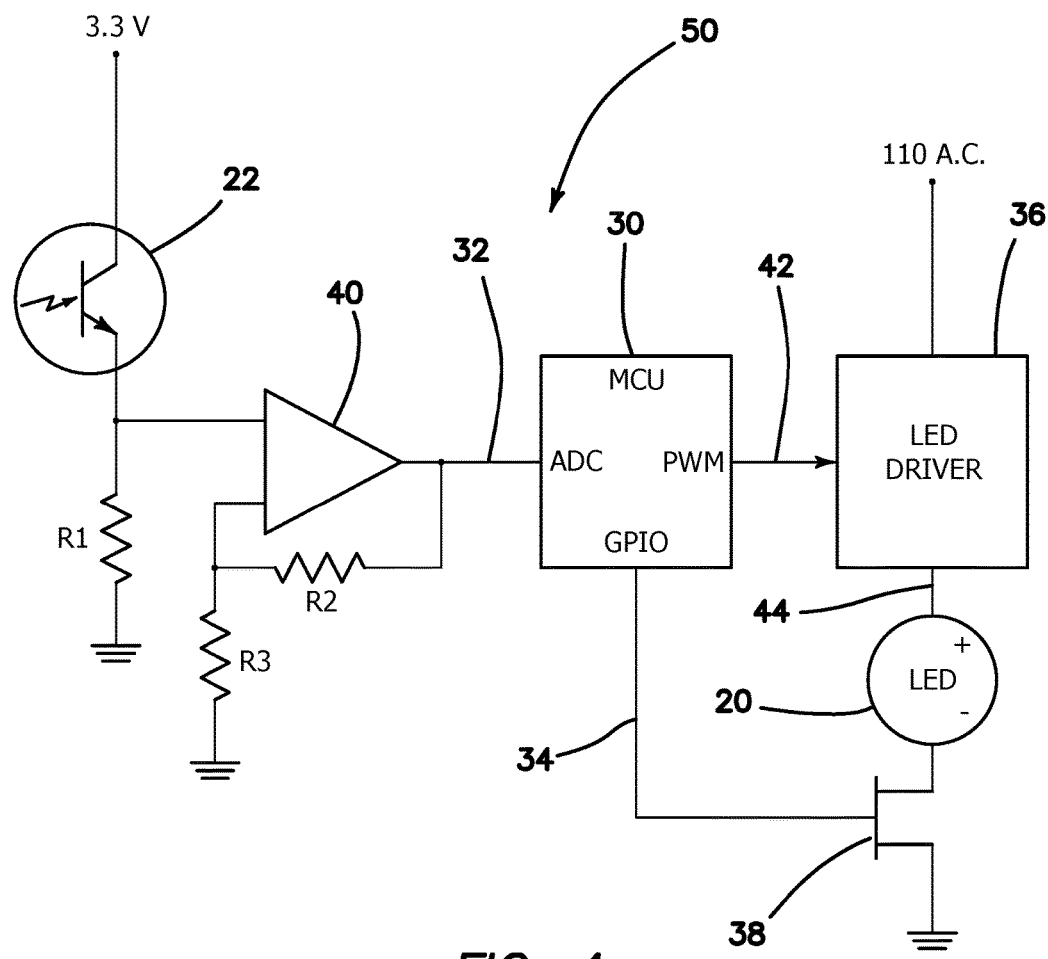
FIG. 4 is a block diagram of a daylight sensing control circuit according to this invention.

FIG. 4 is a block diagram of the electronic control circuit of module 10, generally designated by numeral 50. The module control circuit 50 includes a high intensity LED 20 powered by LED driver circuit 36. LED driver 36 converts AC mains power, such as 110 VAC power, to lower DC voltage 44 for powering LED 20.

Control circuit 50 also includes a microcontroller unit MCU 30 which executes a control algorithm installed as resident firmware. A switch such as FET 38 is connected in the return leg of LED 20. The gate of FET 38 is connected to a GPIO (general purpose input output) control output 34 of MCU 30 for switching the FET 38 between on and off states, thereby turning LED 20 on and off under control of MCU 30.

Figure 5:
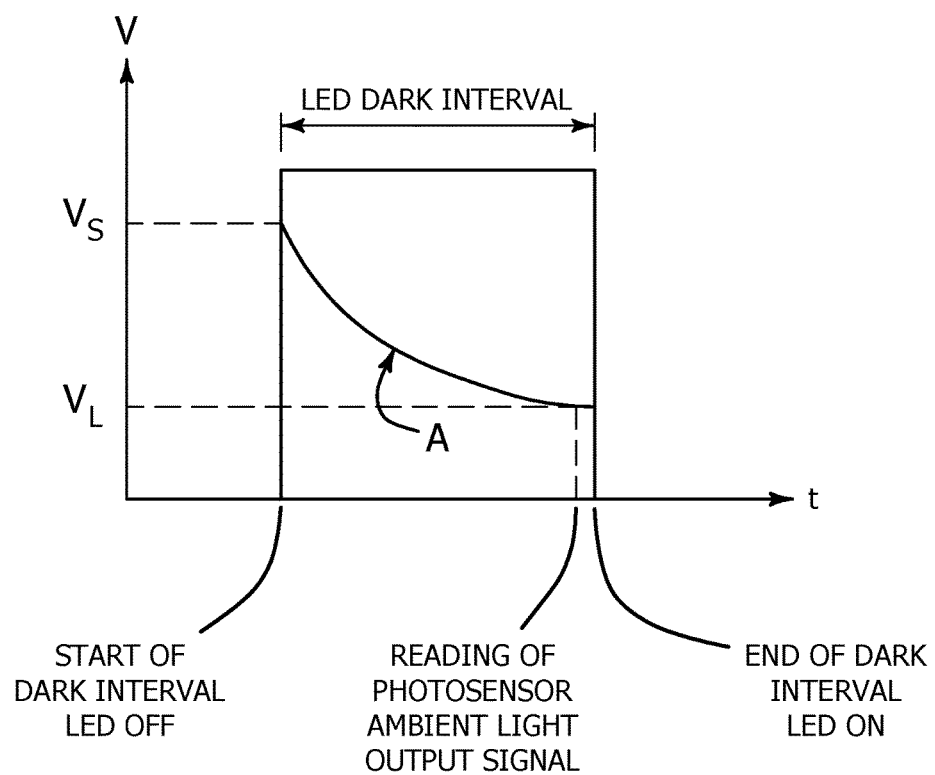
FIG. 5 illustrates the daylight sensing and LED output adjustment sequence of the control circuit of FIG. 4.

During operation of module 10 with LED 20 turned on, the photosensor 22 is driven to saturation by internal reflections of LED light inside cavity 14, including reflection from lens 15, which is not perfectly transmissive and reflects a small percentage of LED light back towards the closed end of cavity 14 and photosensor 22. In order to derive an output from photosensor 22 representative of ambient illumination in space S, MCU 30 rapidly turns off LED 20 responsive to its control algorithm by switching FET 38 to a non-conductive state for a time interval (the dark interval) which is kept sufficiently brief so that the interruption in light output of LED 20 is imperceptible to the human eye, that is, it is not noticeable to a person in the space illuminated by module 10. The dark interval of LED 20 may be, for example, less than one millisecond and preferably about 250 microseconds. When LED 20 is turned off, photosensor 22 begins to recover from its saturated state at a rate which is dependent on the value of resistor R1. Recovery of sensor 22 must occur within a time limited by the need to keep the dark interval imperceptibly short. For this reason phototransistor 22 is chosen to have a relatively fast fall time, preferably about 200 microseconds or less. Sensor recovery is expedited by keeping the value of R1 relatively low. This, however, also reduces the dynamic range of the photosensor's output signal, i.e. reduces the maximum level of the sensor's output signal and would result in relatively poor resolution of the ambient light measurement. Dynamic range is improved by amplification of the sensor output signal by op-amp 40 which may have a voltage gain of e.g. 10, set by resistors R2, R3. The amplified output of sensor 22 is then received as an input by an analog-to-digital converter (ADC) input 32 of MCU 30. MCU 30 reads or captures the sensor output through ADC input 32 at a point in time which is under control of the resident control algorithm. The control algorithm delays the reading of the photosensor signal after turning off LED 20, that is, after the start of the dark interval, and the reading is preferably timed to occur very close to the end of the dark interval, so as to allow maximum available time for recovery of sensor 22 from its saturated state, as shown in the timing diagram of FIG. 5. The dark interval of LED 20 is represented by the square waveform. The output of photosensor 22 is represented by curve A which falls off from a high saturated voltage $V_S$ at the start of the dark interval to a lower voltage $V_L$ representative of measured ambient illumination in space S. If space S is dark when LED 20 is turned off, e.g. it is night time with no daylight or other illumination in space S, the output of photosensor 22 tapers off to near zero by the end of the dark interval. If some degree of ambient illumination exists, the output of photosensor 22 will be at some level above zero but below saturation $V_S$. At the end of the allotted dark interval MCU 30 rapidly turns on LED 20 by switching FET 38 to a conductive state.

MCU 30 is programmed with resident firmware for adjusting the level of artificial illumination provided by LED 20 so as to maintain a desired total level of illumination of space S. The adjustment is made by means of an LED dimming control output of MCU 30, such as PWM (pulse width modulated) control output 42 of MCU 30 which controls LED driver 36. The LED dimming adjustment is made by the MCU control algorithm in response to changes in the output level of photosensor 22 obtained at ADC input 32, depending on the level of ambient illumination provided by available natural daylight and any other sources of illumination in space S. The dimming interface of MCU 30 with LED driver 36 is not limited to a PWM output, and may include other control formats such as a variable voltage level (e.g. 0-10V), I2C (inter-integrated circuit), and SPI (serial peripheral interface), among still others.

In the simple case where S is a small space illuminated by a single lamp module 10, the only other source of ambient illumination may be daylight D streaming through windows or skylights. An appropriate control algorithm for MCU 30 dims the LED 20 so as to add only sufficient artificial illumination L to the measured ambient illumination to achieve a desired target level of total illumination L+D of space S. As ambient illumination including natural daylight D declines, more LED light output L is needed to maintain the target level of illumination. The desired target level of total illumination may be preset in the control firmware of MCU 30 as part of the initial calibration during installation of module 10. In larger installations with multiple modules 10 a more complex control algorithm for MCU 30 will be required, as the ambient illumination sensed by photodetector 22 will include not only available natural daylight but also illumination contributed by other modules 10 or other sources of artificial light in or near space S.

The daylight harvesting light fixture and control system of this invention is not limited to a particular control algorithm for MCU 30, and many variations of such algorithms are possible.

A typical general objective of the control algorithm is to recognize changes in ambient illumination in space S based on output of photosensor 22 and to compute an LED dimming control output to LED driver 36 so as to achieve a desired blend or combination of L and D illumination levels in space S.

Figure 6:
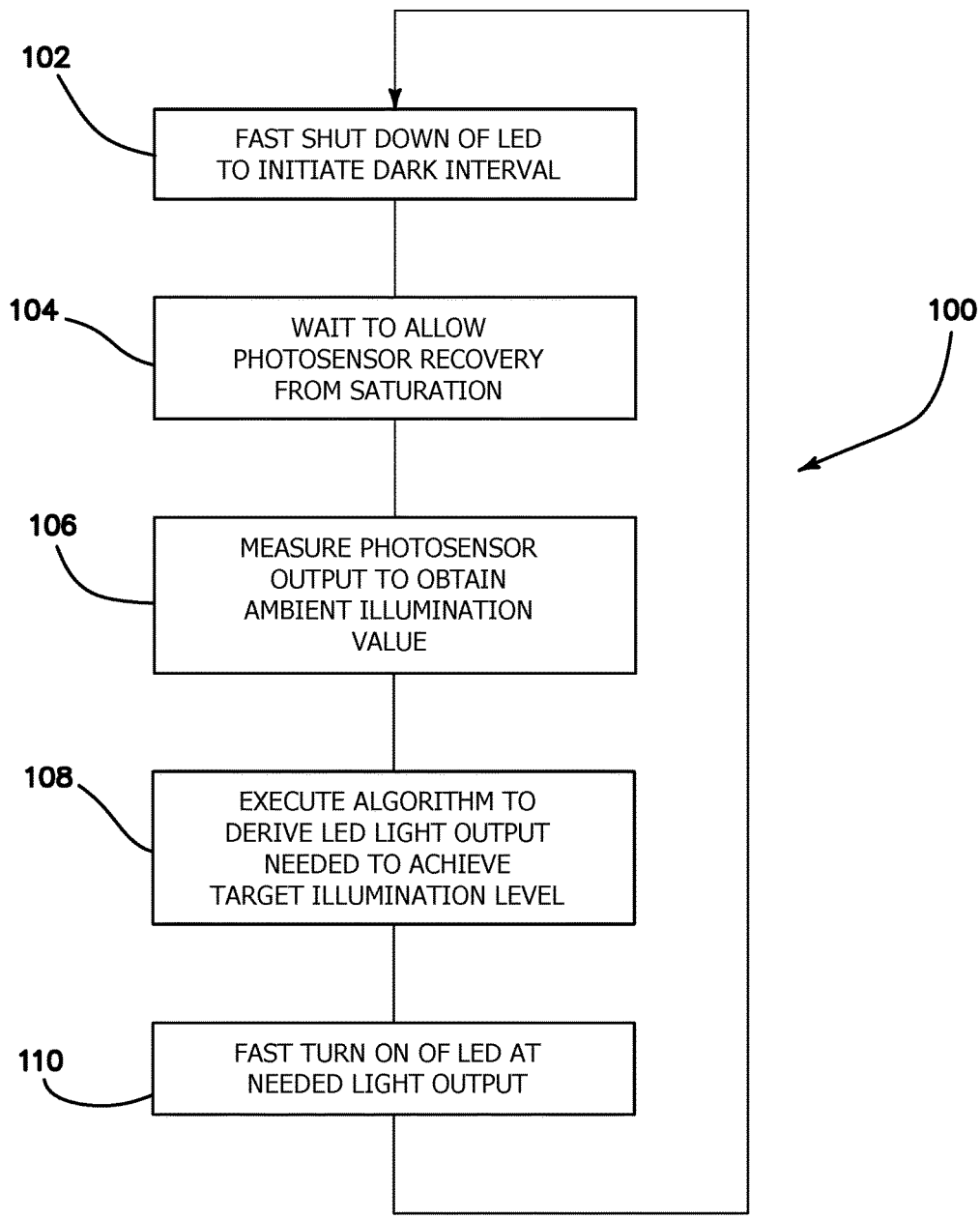
FIG. 6 is a timing diagram of the photosensor ambient illumination reading relative to the LED dark interval in the sequence of FIG. 5.

FIG. 6 illustrates a sequence 100 of steps 102-110 executed by the control algorithm programmed in MCU 30. In step 102, power to LED 20 is turned off by turning off FET 38 thereby initiating the dark interval; step 104 is a wait state to allow recovery of the photosensor 22 from the aforementioned saturated state; in step 106 the ambient illumination output signal derived by the now recovered photosensor 22 is an input to ADC 32 of MCU 30 which captures a value of the measured ambient illumination at a time determined by the control algorithm of MCU 30; in step 108 MCU 30 executes the portion of the control algorithm for computing an output level of artificial illumination by LED 20 needed for maintaining a target level of total illumination of space S in combination with the measured level of ambient illumination; and in step 110 MCU 30 provides an adjusted PWM control input to LED driver 36 and FET 38 is turned on for returning power to LED 20 at the newly adjusted power level. The step sequence 102-110 is repeated cyclically so that the power level to LED 20 and consequent LED light output is adjusted at a sufficiently frequent rate to smoothly compensate for changes in ambient illumination, including changes in natural daylight as well changes in illumination resulting from displacements and movements in the illuminated space S.

The measurement of ambient illumination daylight by MCU 30 can be repeated rapidly, at a rate sufficient to achieve a fine degree of control over total illumination in space S as available daylight changes over the course of the day, and also to compensate for changes in illumination caused by such things as the lowering or raising of window blinds.

With appropriate control coding of MCU 30 the artificial illumination light output of module 10 can be reduced from a maximum light output of LED 20 to take into account available natural daylight in the illuminated space while maintaining a desired target level of illumination of the illuminated space S, thereby conserving electrical power.

Multiple modules 10 installed in a particular interior space S can be networked and programmed as desired to achieve illumination patterns tailored to the particular use and the requirements of the illuminated space S.

What is claimed is:

1. An apparatus for controlling a lamp comprising a lamp housing defining an aperture, an electrically powered light source mounted in the housing for illuminating a space through the aperture, a power supply that provides power for the light source, and a photosensor in the housing that is arranged for sensing illumination in the space through the aperture, the apparatus comprising:
    a switch connected in a circuit path with the light source and the power supply, the switch being arranged to controllably interrupt and restore power to the light source from the power supply;
    a controller coupled to the switch and to the photosensor, wherein the controller is adapted to cause the switch to interrupt power to the light source for a dark interval and to measure an output of the photosensor during the dark interval, the controller further being adapted to control an amount of illumination from the light source based on the measured output; and
    a resistor in an output path of the photosensor, wherein the resistor is configured to limit a duration of the dark interval.

2. The apparatus of claim 1, wherein the controller is further adapted to derive a value representative of existing illumination of said space free of contribution from the light source based on the measured output.

3. The apparatus of claim 2, wherein the controller is further adapted to estimate a supplemental light output from the light source which in combination with the existing illumination suffices to raise total illumination of said space to a target illumination level.

4. The apparatus of claim 3, wherein the controller is further coupled to the power supply and adapted to cause the power supply to an adjusted power level corresponding to the supplemental light output.

5. The apparatus of claim 1, wherein the dark interval has a duration imperceptible to the human eye.

6. The apparatus of claim 5, wherein the duration is less than one millisecond.

7. The apparatus of claim 5, wherein the photosensor has a fall time less than the duration.

8. The apparatus of claim 7, wherein the fall time is less than 200 microseconds.

9. The apparatus of claim 1, further comprising an amplifier coupled between the photosensor and the controller, wherein the amplifier is adapted to amplify the output from the photosensor before it is received by the controller.

10. The apparatus of claim 1, wherein the light source comprises a light emitting diode.

11. A method for controlling a light fixture comprising a housing defining a light aperture, a light source in the housing for providing illumination through the aperture, a power supply adapted to supply power to the light source, and a photosensor in the housing for sensing ambient illumination through the aperture, the method comprising:
    turning off the power to the light source for a dark interval;
    deriving an existing ambient illumination level based on an output of the photosensor output during the dark interval;
    calculating a light source output complementary to the existing ambient illumination level needed to achieve a target ambient illumination;
    controlling a power level from the power supply so as to cause the light source to produce the complementary light source output; and
    configuring a resistor in an output path of the photosensor so as to limit a duration of the dark interval.

12. The method of claim 11, further comprising waiting for a duration during the dark interval before performing the deriving.

13. The method of claim 12, wherein the photosensor has a fall time less than the duration.

14. The method of claim 13, wherein the fall time is less than 200 microseconds.

15. The method of claim 11, wherein the dark interval has a duration imperceptible to the human eye.

16. The method of claim 15, wherein the duration is less than one millisecond.

17. The method of claim 11, wherein the light source comprises a light emitting diode.

* * * * *